United States Patent
Bass et al.

(10) Patent No.: US 6,405,266 B1
(45) Date of Patent: Jun. 11, 2002

(54) UNIFIED PUBLISH AND SUBSCRIBE PARADIGM FOR LOCAL AND REMOTE PUBLISHING DESTINATIONS

(75) Inventors: Michael A. Bass, San Jose; Frank T. Nguyen, Saratoga, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/201,630

(22) Filed: Nov. 30, 1998

(51) Int. Cl.[7] ................................................ G06F 9/00
(52) U.S. Cl. ...................... 709/328; 709/200; 709/230; 709/231; 709/232; 709/238; 709/320; 709/329
(58) Field of Search ................................. 709/202, 221, 709/231, 238, 300, 302, 200, 230, 232, 320, 328, 329

(56) References Cited

U.S. PATENT DOCUMENTS

| | | | | |
|---|---|---|---|---|
| 5,870,562 A | * | 2/1999 | Butman et al. | 709/238 |
| 5,870,605 A | * | 2/1999 | Bracho et al. | 709/302 |
| 5,913,061 A | * | 6/1999 | Gupta et al. | 709/300 |
| 6,014,628 A | * | 1/2000 | Kovarik, Jr. | 705/1 |
| 6,182,143 B1 | * | 1/2001 | Hastings et al. | 709/231 |

OTHER PUBLICATIONS

Booch, Grady. Object–Oriented Analysis and Design with Applications, Second Edition. Santa Clara: Addison–Wesley, 2000.

Gilpin, Mike. Information Brokers: Central Component of an Application Integration Strategy. Giga Information Group, Inc. 1998.

* cited by examiner

Primary Examiner—Zarni Maung
Assistant Examiner—Nabil El-Hady

(57) ABSTRACT

The invention handles message publishing between entities whether they are in the same process, or they are different processes. The invention includes one message broker for each process, which is internal to the process, and which will handle the distribution of events within the process. The invention uses a bus to facilitate distribution messages external to the process. A third party broker distributes the messages between processes. Thus, an object that is internal to the process may subscribe to an event type via the message broker. Likewise, an object can subscribe to an event from an external source. Thus, when an exported event is published via the message broker, the bus will export the message to the third party broker. This event will then be distributed to subscribing processes by the broker. When an event comes into a process via the bus, it is republished using the internal message broker to the interested objects of the process.

23 Claims, 2 Drawing Sheets

UNIFIED PUBLISH AND SUBSCRIBE PARADIGM FOR LOCAL AND REMOTE PUBLISHING DESTINATIONS

RELATED APPLICATIONS

Reference is made to the following co-pending and commonly assigned U.S. patent application entitled MECHANISM FOR CONNECTING DISPARATE PUBLICATION AND SUBSCRIBE DOMAINS VIA THE INTERNET, Ser. No. 09/201,635, which is hereby incorporated herein by reference.

TECHNICAL FIELD

This invention relates in general to network communications, and in specific to information sharing within a domain of a publication/subscribe communication system.

BACKGROUND

Publication and subscribe (PUB/SUB) is a mechanism for the distribution of information in a computer system or domain. A broker is used to send information to interested parties. An individual would construct a process that would detail the particular types or forms of information that the individual is interested in receiving. The process would then subscribe with the broker to receive such information. Processes that desire or are required to share information, send the information to the broker. The broker then sends the information to subscribed processes. Note that subscribing processes do not have any knowledge of the sending process. Likewise, the sending process does not have any knowledge of the subscribing processes.

A single process of a domain typically includes multiple process objects. Each object may send (or receive) information to (or from) other objects with in the process (intraprocess communications) or may send (or receive) information to (or from) objects from other processes within the domain (interprocess communication). Note that intraprocess communications is typically between objects running in the same address space, whereas interprocess communications is typically between objects running in the different address space.

There are well defined and implemented interprocess PUB/SUB engines in existence today. These engines do well in creating an architecture for sharing information between processes. However, there is little architecture in place in regards to how events are delivered inside the process to the appropriate location. In other words, there are few architectures which allow for message and information sharing between objects within the same process, and the architectures that are available are difficult to use. The most sophisticated is association of a callback method with an event subject or class of events. This is insufficient as it is often the case that multiple objects within a process may be interested in an event type. Current architecture does not allow distribution of the event to these multiple objects, nor is it consistent with any internal information sharing architecture.

Interprocess communications in object oriented code have been performed in a synchronous manner. For example, one form of interprocess communications uses TCP/IP protocol, wherein a TCP/IP server listens for requests from one process to access data in another process. However, with this technique marshaling becomes a factor as the two processes involved in the communication could reside on different machines with different formats. Thus, code would have to be manually written to allow for marshaling and unmarshalling of the communications. Another form is a distributed computing environment remote procedure call (DCE-RPC). This form links the communicating processes together, and thus marshaling is no longer required. Another form is common object request broker architecture (CORBA), which is similar to DCE. However, in, DCE the calling process must know the location of the called process. Whereas, in CORBA, the calling system uses a name server to locate the called procedure. Thus, all of the process must register with the name server for CORBA to operate properly. However, all synchronous communications mechanism suffer the same common problem, i.e. both processes must be alive during communications. Consequently, the system is very fragile system, as a problem with one process will halt operations of the other process.

PUB/SUB systems communicate asynchronously, and thus do not suffer the problems of synchronous communications. PUB/SUB systems use a queuing mechanism for routing information so process A can request information from process B, which may not be alive. The request will be queued until B is alive and can satisfy the request. The PUB/SUB broker knows to forward the request to process B when process B is alive.

Note that the discussion so far is with regards to interprocess communications, and not intraprocess communications. Intraprocess communications is typically performed synchronously, via a direct procedure call, wherein one object directly invokes another object. This call is a local form of the CORBA DCE call.

Therefore, PUB/SUB systems have two different mechanism for accessing remotely located information, one mechanism for intraprocess information (i.e. information that is located with another object in the same process) and another for interprocess information (i.e. information that is located with another object in a different process). Thus, for PUB/SUB systems, every time an object want publish information a different mechanism must be used. This problem is exemplified by the system depicted in FIG. 3.

FIG. 3 depicts a prior art PUB/SUB system 300 with two processes, process A 301 and process B 302, that communicate with each other via broker 303. Process A has two objects, object 1 304 and object 2 305, and process B has two objects, object 3 306 and object 4 307. Note that the double headed arrows indicate the bi-directional flow of information between the connected elements. When objects within a process desire to communicate with each other, they use a synchronous mechanism, the internal event application programming interface (API) 308. This API is a non-standard application specific API usually rewritten by the programmers. The specific nature of the API is a problem, in that upgrades and transportability are difficult, not to mention the costs of the initial creation. When an object desire to communicate with an object located in a different process, a different API must be used. The PUB/SUB API 309 is an asynchronous mechanism that sends information to the broker 303 for publication, via object 310. Note that this API is actually different depending on the vendor of the broker being used.

Thus, for an object to publish a message, the object must determine if the destination object is with in its process (or uses the same address space) or if the destination object is in a different process (or uses different address space). If the object is local, then the internal event API 308 must be used. Moreover, the internal event API requires that the object know the destination location. If the object is remote, then the PUB/SUB API 309 must be used. Note that location transparency is achieved with PUB/SUB, thus the destination location does not have to be known. However, the vendor of the PUB/SUB API must be known, as it is their specific API that must be used.

For example, suppose object 1 desires to send information message Xa to object 2 and object 4. Note that the single headed arrows indicate the direction of movement of message Xa in this example. For object 1 to send Xa to object 2, object would have to use the internal event API 308, and specify the precise location of object 2. This would route the message from object 1 to object 2. For object 1 to send Xa to object 4, object 1 would have to use the vendor specific PUB/SUB API 309. This would route the message through the client object 310 to the broker 303, which would then publish the message to process B via client object 311 and on to object 4.

Burdening each object of each process with this much information and functionality is troublesome. It makes object communication difficult. Moreover, changes to the system will force changes in the objects, for example use a different PUB/SUB vendor will cause modification to existing objects API communication. Thus, the system is tightly coupled, and subject to more changes. Moreover, if an object wants to send a message to both local and remote objects, then the object must actually send to messages, one using the internal API and a second using the PUB/SUB API. This slows down programming of the system.

Therefore, with the prior art, a different AP is used for synchronous intraprocess communication than with asynchronous interprocess communication. Consequently, each object must have the knowledge and ability to select the proper API. For the asynchronous 0interprocess API, the actual API used depends on which vendor software is used for the PUB/SUB system. Consequently, the vendor's specific API must be used and if the vendor is changed, then the code must be changed.

For the synchronous interprocess API, location transparency is not achieved. Consequently, the object must have the knowledge of the destination object and identify the destination to the API.

Therefore, there is a need in the art for a communication mechanism that does not burden each object with communication information and functionality. Moreover, the mechanism would provide location transparency for both local and remote destinations.

SUMMARY OF THE INVENTION

These and other objects, features and technical advantages are achieved by a system and method which uses a unified publish and subscribe paradigm that handles message publishing between entities whether they are in the same process, or they are different processes. The invention operates asynchronously and transparently. Thus, a sending entity does not need to know the location of the destination entity. Moreover, the sending entity does not have to select between two different APIs, in other words, the same API is used to perform both interprocess communications and intraprocess communications.

The invention includes one message broker for each process, which is internal to the process, and which will handle the distribution of events within the process. An object that is internal to the process may subscribe to an event type via the message broker. When another object publishes an event with the same event type, the message broke will invoke a callback on the subscribing object in a thread safe manner. This will be repeated for all subscribing objects. Messages will be delivered only once and asynchronously.

The invention uses a bus, to facilitate distribution messages external to the process. The bus relies on the message broker as a transport for events internal to a process. A programmer configures the bus to export certain event types. Likewise, an object can subscribe to an event from an external source. Thus, when an exported event is published via the message broker, the bus will export the message to an external PUB/SUB engine or broker. This event will then be distributed to subscribing processes by the engine. When an event comes into a process via the bus, it is republished using the internal message broker to the interested objects of the process.

The same message broker API is used for both internal and external publishing. In fact, the publishing object does not need to know whether the event will be exported for external publishing, nor does a subscribing object need to know that the event source is external to the process. Furthermore, the bus abstracts the underlying PUB/SUB engine or broker, such that the programmer does not need to be concerned with which vendor's pub/sub engine is in use. Therefore, the API is said to be unified, as the paradigm is the same for internal and external publishing.

Therefore, it is a technical advantage of the present invention to use the same API for both internal and external publishing.

It is another technical advantage of the present invention that processes and objects are abstracted from the particular vendor PUB/SUB engine.

It is a further technical advantage of the present invention that objects do not need to know the source or destination of messages.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
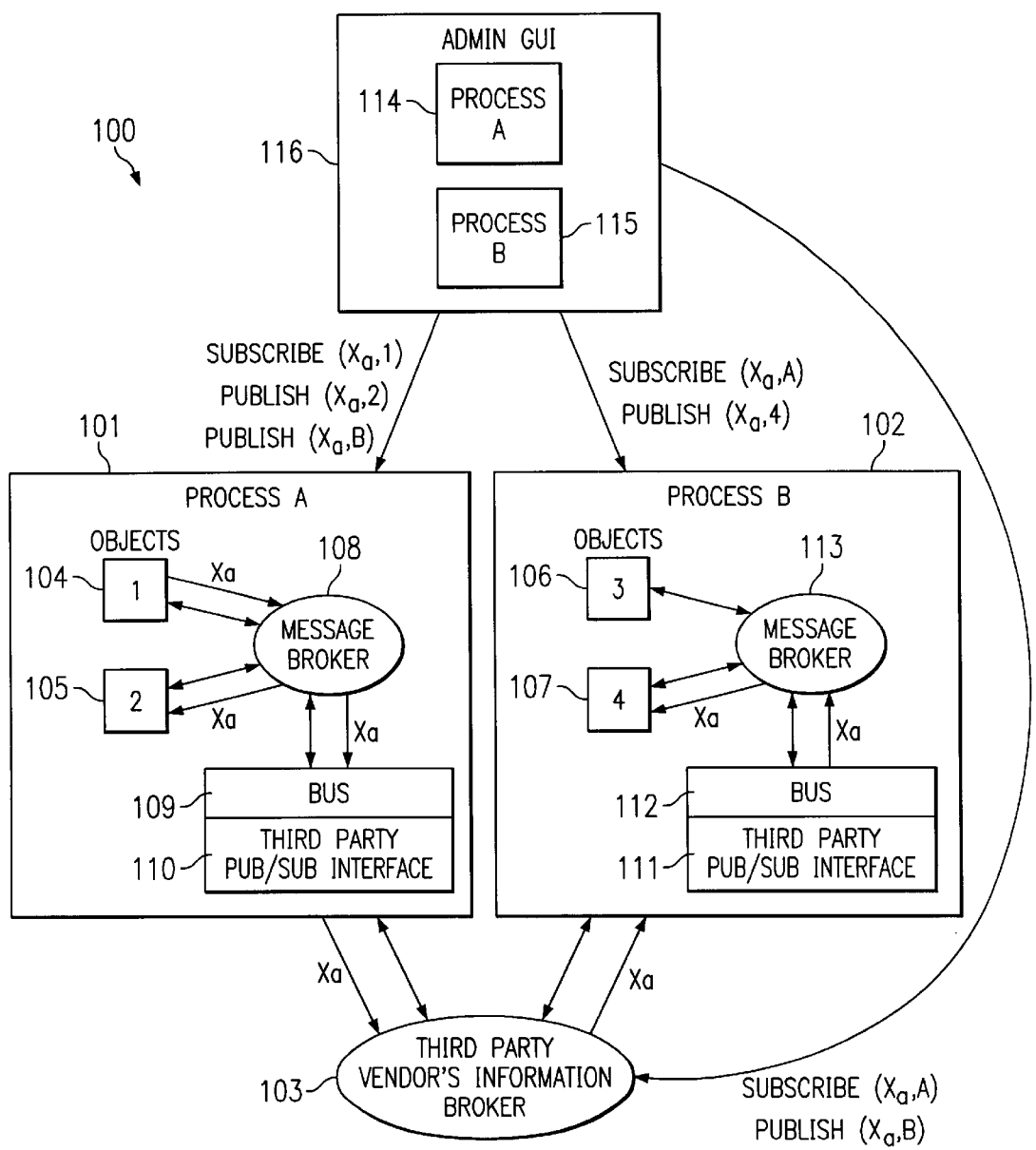
FIG. 1 depicts a block diagram of the inventive publish and subscribe system using a message broker and bus for message delivery.

FIG. 1 depicts the inventive PUB/SUB system 100 with two processes, process A 101 and process B 102, that communicate with each other via broker 103. Note that broker is synonymous with engine. Process A has two objects, object 1 104 and object 2 105, and process B has two objects, object 3 106 and object 4 107. Note that the double headed arrows indicate, the bi-directional flow of information between the connected elements. A process is a running program written in an object oriented language, which comprises a collection of objects. An object is a set of data members and methods which act upon those members. An object is defined by a class definition and an object is a particular instantiation of that class definition. For further discussions of object oriented programming refer to "Object-Oriented Analysis and Design with Applications" of the Addison-Wesley Object Technology Series by Grady Booch, ISBN 0805353402, 2nd edition, February 1994, which is hereby incorporated herein by reference. For further discussions of PUB/SUB systems refer to "Information Brokers: Central Component of an Application Integration Strategy" by Mike Gilpin, Oct. 8, 1998 Giga Information Group Inc, document number 176583-MG98, which is hereby incorporated herein by reference.

The inventive system uses a message broker API 108, 113 that is internal to each process to send and receive messages (or events) with the objects in the process. An object may subscribe to an event type via the message broker API. When another object within the process publishes an event with the same event type, the message broker will invoke a callback on the subscribing object in a thread safe manner. This will be repeated for all subscribing objects. Messages will be delivered only once and asynchronously. Since, events are delivered in their own thread of execution (such the publisher does not wait for the event to be delivered), then a single event delivery failure will not disable the entire system. Moreover, there is no need for objects that publish and subscribe to know about other objects within the process, i.e. there is no need to have a reference between the publisher and subscriber. Therefore, the message broker removes the burden from the objects of having the knowledge and functionality for determining internal/external objects, as well as the knowledge of object destination and PUB/SUB vendor.

The inventive system uses bus 109, 112 as an interface between the message broker 108, 113 and the vendor PUB/SUB system, specifically the PUB/SUB interface 110,111. The bus is the mechanism that transports messages external to the process. Thus, events or messages are relayed over a network in a publish/subscribe manner, to other programs running in this network. The bus is dependent on the Message Broker, but not the reverse. The bus does not rely on a particular external messaging system. It does have a framework that allows for any publish and subscribe system to be "plugged-in" to the architecture. Thus, with the addition of a few administrative commands, events published using the Message Broker API will automatically go external. Likewise, events for which subscriptions are held will be received from an external source and be distributed appropriately to all internal subscribers. Therefore, the bus makes the message broker API PUB/SUB vendor independent. Thus, a different vendor PUB/SUB system can be implemented without having to modify the processes.

The inventive system uses the administrative graphical user interface (admin GUI) 116 to configure the message broker API 108, 113 and the vendor broker 103 for routing of messages. The GUI 116 maintains events lists 114, 115 for each process in its domain. These lists detail which events are potentially published and subscribed to by the different processes, as well as the objects with in each process. In this example, Object 1 of process A desires to send message Xa to all interested parties, object 2 of process A desires to receive any messages Xa from any parties, and object 4 of process B desires to receive any messages Xa from any parties.

The GUI 116 configures message broker 108 to receive Xa from object 1 with the instruction SUBSCRIBE (Xa,1). The GUI configures message broker 108 to send Xa to object 2 of process A with the instruction PUBLISH (Xa,2). The GUI configures message broker 108 to send Xa to object 4 of process B with the instruction PUBLISH (Xa,B). Note that this instruction will cause the message broker to route the message to bus 109, which will then send the instruction on to broker 103 for further routing, via interface 110.

The GUI 116 configures vendor broker 103 to receive Xa from process A the instruction SUBSCRIBE (Xa,A). The GUI configures vendor broker 103 to send Xa to process B with the instruction PUBLISH (Xa,B).

The GUI 116 configures message broker 113 to receive Xa from the vendor broker 103, via interface 111 and bus 112, with the instruction SUBSCRIBE (Xa,A). The GUI configures message broker 113 to send Xa to object 4 of process B with the instruction PUBLISH (Xa,4).

With the message brokers 108, 113 and the vendor broker 103 configured as described above, a publication of Xa by object 1 would result in the following. Note that the single headed arrows indicate the direction of movement of message Xa in this example. Object 1 publishes Xa to the subscribing message broker API 108. Object 1 has no knowledge of the receiving objects, nor does it have any choice in APIs to use. The message broker API 108 then publishes Xa to object 2 and to bus 109. Bus 109 pass Xa to subscribing vendor broker 103, via interface 110. Vendor Broker 103 then publishes Xa to subscribing message broker 113, via interface 111 and bus 112. Message broker 113 then publishes Xa to subscribing object 4. Note that all transfers are being performed asynchronously.

The invention can be implemented as software written in an object oriented language such as JAVA.

Figure 2:
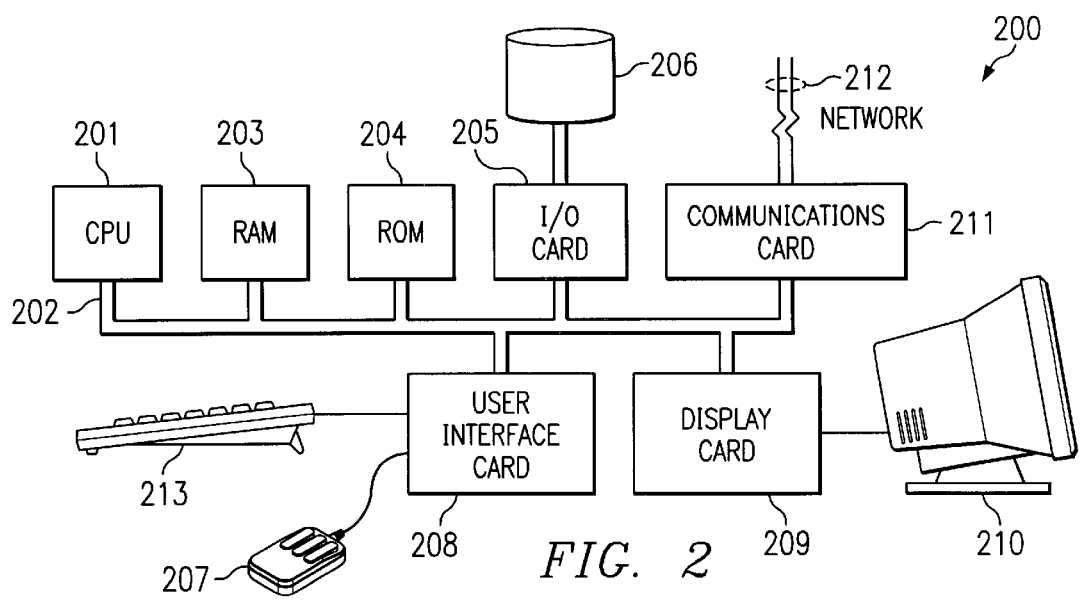
FIG. 2 depicts a block diagram of a computer system adapted to implement the present invention of FIG. 1.
Figure 3:
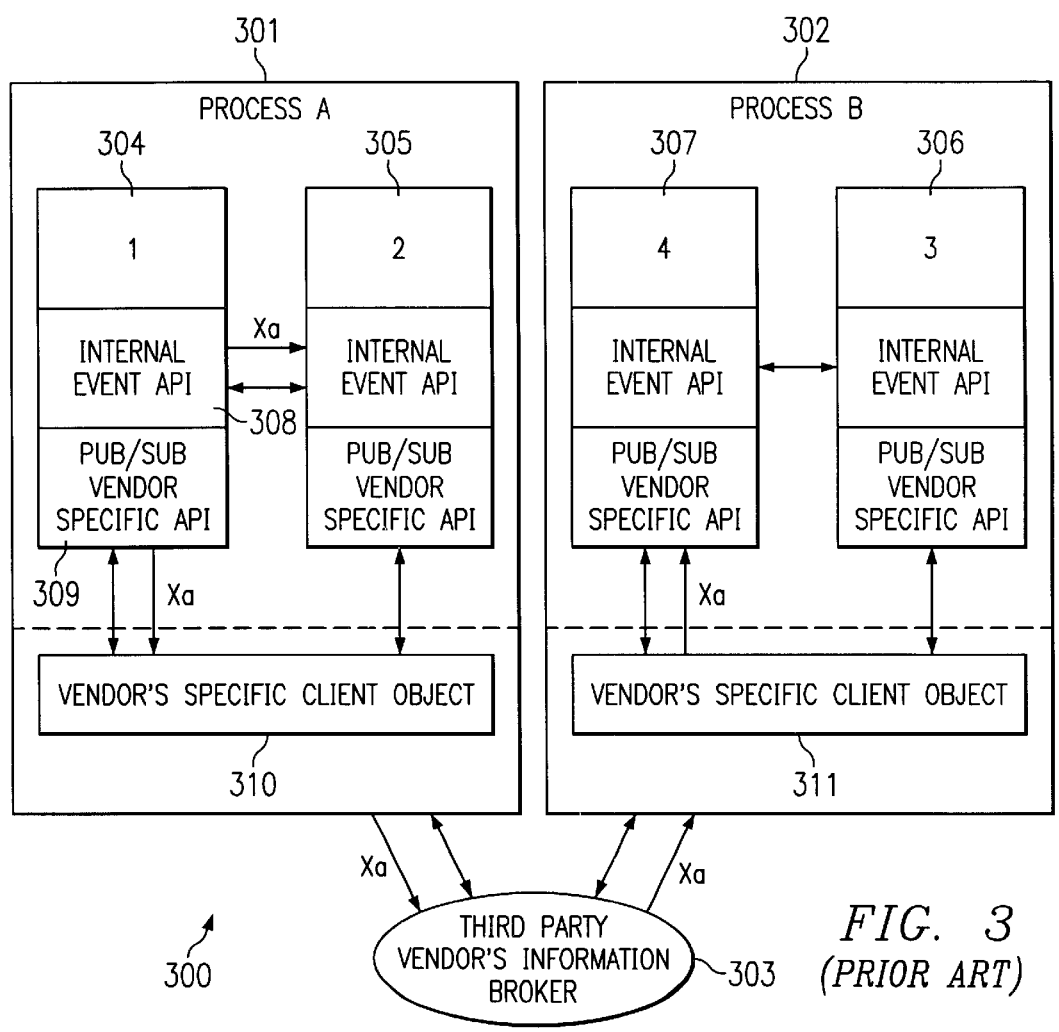
FIG. 3 depicts a block diagram of a prior art publication and subscribe system.

FIG. 2 illustrates a computer system 200 adapted for use with the present invention. One, some of all processes as well as the broker may be operating on system 200, or they may be operating on multiple instances of system 200 coupled through the network 212. In the system 200, central processing unit (CPU) 201 is coupled to bus 202. In addition, bus 202 is coupled to random access memory (RAM) 203, read only memory (ROM) 204, input/output (I/O) card 205, communications card 211, user interface card 208, and display card 209.

RAM 203 and ROM 204 hold user and system data and programs as is well known in the art. I/O card 205 connects storage devices, such as hard drive 206, to the computer system. Communications card 211 is adapted to couple the computer system to a local, wide-area, or Internet network 212. User interface card 208 couples user input devices, such as keyboard 213 and pointing device 207, to the computer system 200. Finally, display card 209 is driven by CPU 201 to control the display on display device 210. CPU 201 may be any general purpose CPU, such as a HP PA-8200. However, the present invention is not restricted by the architecture of CPU 201 as long as CPU 201 supports the inventive operations as described herein.

Although the present invention and its advantages have been described in detail, it should be understood that various changes, substitutions and alterations can be made herein without departing from the spirit and scope of the invention as defined by the appended claims.

What is claimed is:

1. A routing system for delivering a message from a first object in a first process to any subscribing entities, wherein a second object is a subscribing entity to the message, the system comprising:
   an engine for controlling message flow between the first process and another process, and has information regarding subscribing processes to the message;
   at least one message broker, at least one of which is resident in the first process, the at least one message broker resident in the first process having information regarding subscribing entities to the message within the first process, and information regarding whether the engine is a subscribing entity to the message; and
   a graphical user interface (GUI) that provides the information to the at least one message broker resident in the first process and the information to the engine;
   wherein if the second object is resident in the first process, then the at least one message broker resident in the first process delivers the message to the second object; and if the second object is resident on a second process, then the engine is a subscribing entity and the at least one message broker resident in the first process routes the message to the second process through the engine for delivery by the second process.

2. The routing system of claim 1, wherein:
   the routing system is a publication and subscription (PUB/SUB) routing system; and
   the engine is a PUB/SUB engine.

3. The routing system of claim 1, further comprising:
   at least one bus that is resident in the first process, and connects the at least one message broker resident in the first process to an interface with the engine;
   wherein the bus passes messages received from the at least one message broker resident in the first process to the engine via the interface, and the bus passes messages received from the engine, via the interface, to the at least one message broker resident in the first process.

4. The routing system of claim 1, wherein:
   the information to the at least one message broker resident in the first process and the information to the engine include at least one subscribe statement and at least one publish statement.

5. The routing system of claim 4, wherein:
   the one subscribe statement instructs a holder of the subscribe statement to receive a message; and
   the one publish statement instructs a holder of the publish statement to send the message to a particular entity.

6. The routing system of claim 1, wherein the routing system is a program written in an object oriented language.

7. The routing system of claim 1, wherein the second object is resident on the second process, and the second process is a subscribing process with the engine, the system further comprising:
   another message broker, which is resident in the second process, and has information regarding subscribing entities to the message within the second process;
   wherein the another message broker receives the message from the engine and delivers the message to the second object.

8. A method for routing a message from a first object in a first process to any subscribing entities, wherein a second object is a subscribing entity to the message, the method comprising the steps of:
   controlling message flow between the first process and another process, via an engine that has information regarding subscribing processes to the message;
   controlling message flow within the first process, via a message broker that has information regarding subscribing entities to the message within the first process, and information regarding whether the engine is a subscribing entity to the message;
   providing the information to the message broker, via a graphical user interface (GUI);
   providing the information to the engine, via the GUI;
   delivering the message to the second object, via the message broker, if the second object is resident in the first process; and
   routing the message to the second object, via the message broker through the engine, if the second object is resident on a second process.

9. The method of claim 8, wherein:
   the method operates on a publication and subscription (PUB/SUB) routing system; and
   the engine is a PUB/SUB engine.

10. The method of claim 9, wherein the routing system is a program written in an object oriented language.

11. The method of claim 8, further comprising the steps of:
    connecting the message broker to an interface with the engine via a bus that is resident in the first process;
    passing messages from the message broker to the engine through the interface, via the bus; and
    passing messages from the engine through the interface to the message broker, via the bus.

12. The method of claim 8, wherein:
    the information to the message broker and the information to the engine include at least one subscribe statement and at least one publish statement.

13. The method of claim 12, further comprising the steps of:
    instructing, via the one subscribe statement, a holder of the subscribe statement to receive a message; and
    instructing, via the one publish statement, a holder of the publish statement to send the message to a particular entity.

14. The method of claim 8, wherein the second object is resident on the second process, and the second process is a subscribing process with the engine, the method further comprising the steps of:
    controlling message flow within the second process, via another message broker that has information regarding subscribing entities to the message within the second process; and
    delivering the message to the second object, via the anther message broker.

15. A computer program product having a computer readable medium having computer program logic recorded thereon for routing a message in a publication and subscription (PUB/SUB) routing system, from a first object in a first process to any subscribing entities, wherein a second object is a subscribing entity to the message, the computer program product comprising:
    means for controlling message flow between the first process and another process, that has information regarding subscribing processes to the message;
    means for controlling message flow within the first process that has information regarding subscribing entities to the message within the first process, and information regarding whether the means for controlling message flow between the first process and another process is a subscribing entity to the message;

a graphical user interface (GUI) for providing the information to the means for controlling message flow between the first process and another process and for providing the information to the means for controlling message flow within the first process;

means for delivering the message to the second object if the second object is resident in the first process; and means for routing the message to the second object through the means for controlling message flow between the first process and another process if the second object is resident on a second process.

16. The computer program product of claim 15, wherein the second object is resident on the second process, and the second process is a subscribing process with the means for controlling message flow within the first process, the computer program product further comprising:

means for controlling message flow within the second process, that has information regarding subscribing entities to the message within the second process; and means for delivering the message to the second object, via the means for controlling message flow within the second process.

17. The computer program product of claim 15, wherein the information to the the means for controlling message flow within the first process and the information to the means for controlling message flow between the first process and another process include at least one subscribe statement and at least one publish statement, the computer program product further comprising:

means for instructing, via the one subscribe statement, a holder of the subscribe statement to receive a message; and means for instructing, via the one publish statement, a holder of the publish statement to send the message to a particular entity.

18. The routing system of claim 1, wherein the GUI configures the engine and the at least one message broker for routing of the message.

19. The routing system of claim 1, wherein the GUI maintains a list for each process that defines whether the message is associated with the particular process.

20. The method of claim 8, wherein:

the step of providing the information to the message broker includes configuring the message broker via the GUI for routing of the message; and the step of providing the information to the engine includes configuring the engine via the GUI for routing of the message.

21. The method of claim 8, further comprising:

maintaining, via the GUI, a list for each process that defines whether the message is associated with the particular process.

22. The computer program product of claim 15, wherein the GUI configures the means for controlling message flow between the first process and another process and means for controlling message flow within the first process for routing of the message.

23. The computer program product of claim 15, wherein the GUI maintains a list for each process that defines whether the message is associated with the particular process.

* * * * *

UNITED STATES PATENT AND TRADEMARK OFFICE
CERTIFICATE OF CORRECTION

PATENT NO. : 6,405,266 B1
DATED : June 11, 2002
INVENTOR(S) : Michael A. Bass et al.

It is certified that error appears in the above-identified patent and that said Letters Patent is hereby corrected as shown below:

Column 3,
Line 34, delete "0".

Signed and Sealed this

Eighteenth Day of February, 2003

JAMES E. ROGAN
*Director of the United States Patent and Trademark Office*